United States Patent
Kai

(10) Patent No.: US 7,884,756 B2
(45) Date of Patent: Feb. 8, 2011

(54) RADAR APPARATUS

(75) Inventor: Koichi Kai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 73 days.

(21) Appl. No.: 12/392,506

(22) Filed: Feb. 25, 2009

(65) Prior Publication Data

US 2010/0085240 A1    Apr. 8, 2010

(30) Foreign Application Priority Data

Oct. 6, 2008    (JP) .............................. 2008-259858

(51) Int. Cl.
*G01S 13/00*    (2006.01)
(52) U.S. Cl. .................... 342/149; 342/107; 342/111; 342/115; 342/127; 342/192
(58) Field of Classification Search ............... 342/70, 342/107, 111, 113, 115, 127, 146, 192, 196
See application file for complete search history.

(56) References Cited

U.S. PATENT DOCUMENTS

2004/0252047 A1* 12/2004 Miyake et al. ............... 342/107
2007/0153255 A1* 7/2007 Ishii et al. ................... 356/28
2008/0278368 A1* 11/2008 Noda .......................... 342/133

FOREIGN PATENT DOCUMENTS

JP    2008-39718 A    2/2008

OTHER PUBLICATIONS

Ralph O. Schmidt, "Multiple Emitter Location and Signal Parameter Estimation", IEEE Transactions on Antennas and Propagation, vol. AP-34, Mar. 1986, pp. 276-280, No. 3.

* cited by examiner

*Primary Examiner*—Thomas H Tarcza
*Assistant Examiner*—Timothy A Brainard
(74) *Attorney, Agent, or Firm*—Sughrue Mion, PLLC

(57) ABSTRACT

A radar apparatus measures an azimuth angle with a calculation device that performs super-resolution angle measuring processing in which relative speeds and relative distances among target objects are calculated, when two azimuth angles are obtained for a given target object that has been detected, the calculation device performs an other-signal detection processing in which, among other detected target objects, a target object is searched whose azimuth angle is the same as one of the two azimuth angles and whose beat frequency upon frequency-increasing modification or frequency-decreasing modification is the same as that of the given target object; and when, through the other-signal detection processing, another target object that satisfies the condition is detected, the calculation device eliminates one of two azimuth angles of the detected given target object, which is equal to the azimuth angle of said another target object detected through the other-signal detection processing.

3 Claims, 8 Drawing Sheets

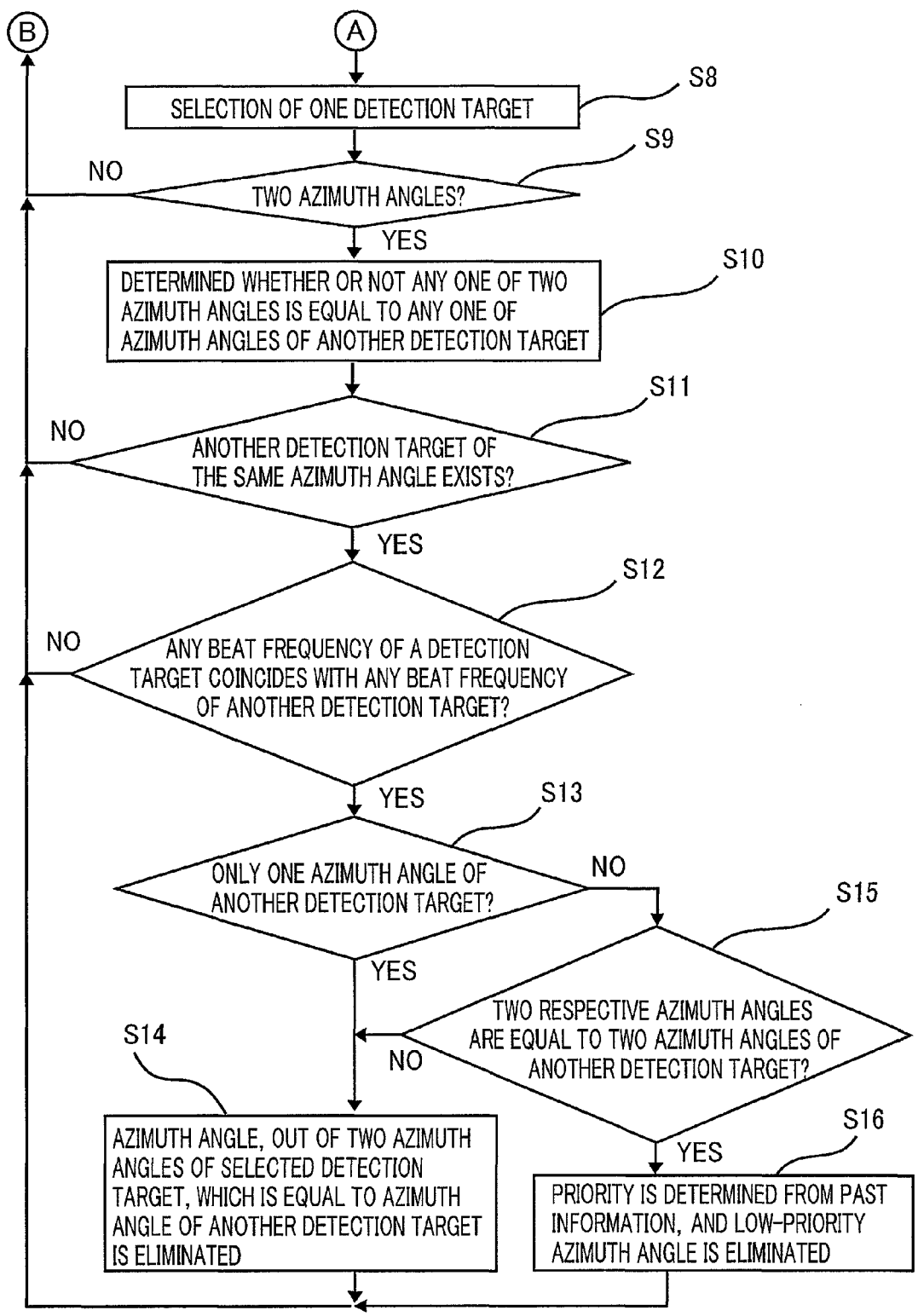

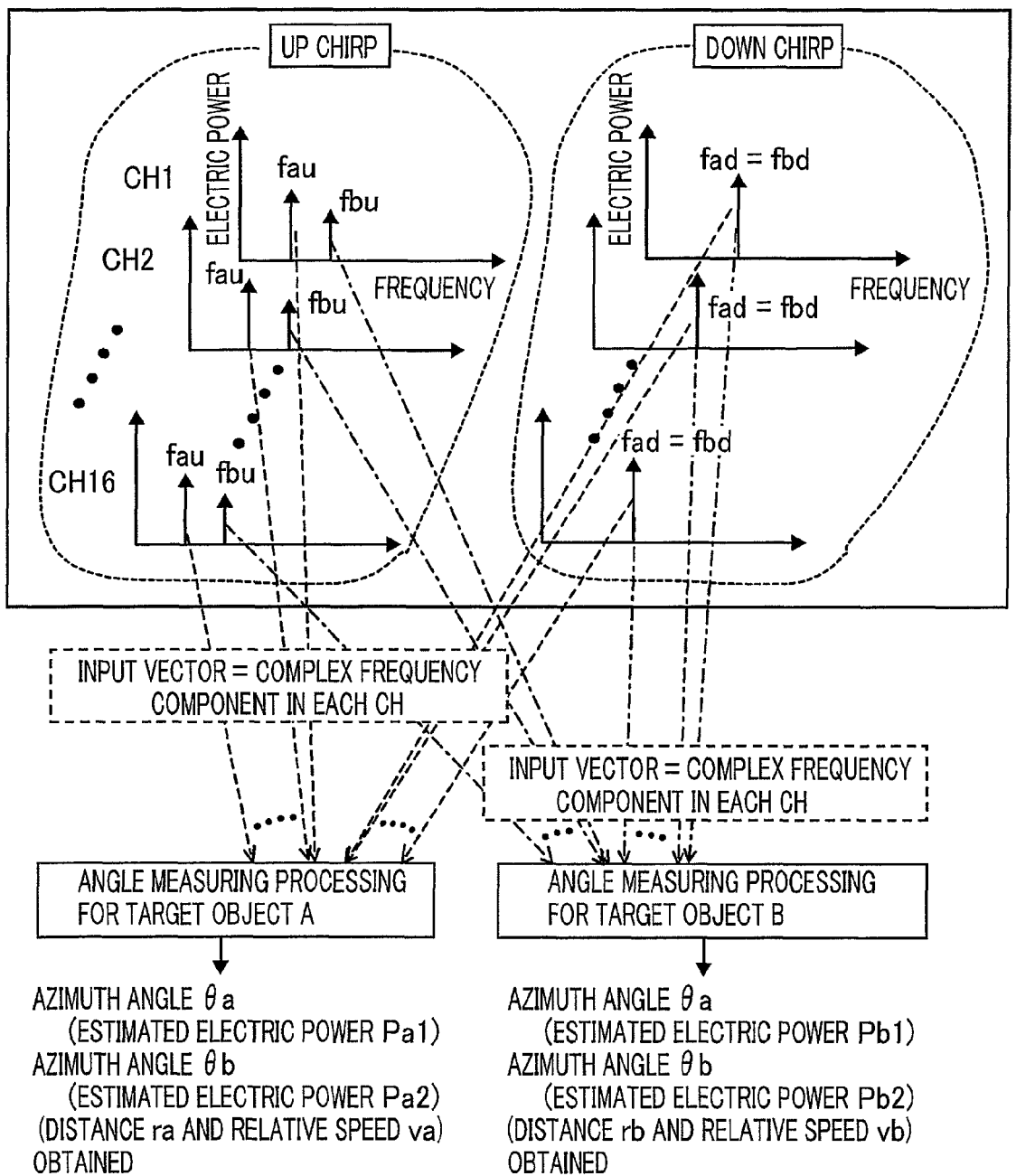

RADAR APPARATUS

BACKGROUND OF THE INVENTION

1. Field of the Invention

The present invention relates to a radar apparatus capable of obtaining the correct azimuth angle of a target object, by means of super-resolution angle measuring processing.

2. Description of the Related Art

For example, in Japanese Patent Application Laid-Open No. 2008-39718, there is disclosed a method in which, after the relative speed of a target object and the distance between the reference point and the target object are calculated by utilizing a FMCW method in which frequency modulation is applied to a continuous wave and based on the beat frequency between a transmission signal and a reflection signal from the target object at a time when the frequency of the transmission signal increases and the beat frequency between the transmission signal and the reflection signal from the target object at a time when the frequency of the transmission signal decreases, the azimuth angle of the target object is obtained by means of super-resolution angle measuring processing such as "MUSIC" (Multiple Signal Classification). "MUSIC" is described, for example, in "Multiple Emitter Location and Signal Parameter Estimation", by R. O. Schmidt, IEEE Trans. AP-34, 3, pp. 276 to 280 (1986).

The input in super-resolution angle measuring processing such as MUSIC is the vectors of input signals from a plurality of reception antennas. In a radar apparatus, utilizing a FMCW method, disclosed in Japanese Patent Application Laid-Open No. 2008-39718, in order to obtain input-signal vectors, a frequency analysis means based on a fast Fourier transformation (FFT) is utilized in many cases. In a FMCW method, the relative speed of a target object and the distance between the reference point and the target object are calculated, based on the sum of and the difference between the frequency of the beat signal at a time when the frequency increased (referred to as UP chirping, hereinafter) and the frequency of the beat signal at a time when the frequency decreased (referred to as DOWN chirping, hereinafter). Next, in order to obtain the azimuth angle, by utilizing, as input-signal vectors, complex frequency components of the beat signal, at each of the reception antennas upon UP chirping and DOWN chirping, which corresponds to the relative speed of a target object and the distance between the reference point and the target object, one or more azimuth angles can accurately be obtained by means of super-resolution angle measuring processing.

In the conventional radar apparatus, in the case where a plurality of target object exists, as represented in FIG. 3, one of beat frequencies upon UP chirping and beat frequencies upon DOWN chirping may coincide with each other (one another) in some cases. At this moment, the input-signal vector for the super-resolution angle measuring processing also includes the vector of a reception signal from another target object. If the super-resolution angle measuring processing is implemented based on the input-signal vector, not only a correct azimuth angle but also an azimuth angle of another target object is obtained. Accordingly, as represented in FIG. 4, not only the correct relative speed and azimuth angle (θa, in FIG. 4) of the target object and the correct distance between the reference point and the target object, but also the incorrect relative speed and azimuth angle (θb, in FIG. 4) of another target object and the incorrect distance between the reference point and another target object are obtained. In addition, in FIG. 3, reference numeral 20 denotes a radar apparatus; reference numeral 21 denotes a detection target A having a distance of ra from the radar apparatus 20, a relative speed of va, and an azimuth angle of θa; reference numeral 22 denotes a detection target B having a distance of rb from the radar apparatus 20, a relative speed of vb (=0), and an azimuth angle of θb; the abscissa and the ordinate of each of the graphs denote the beat-signal frequency after FFT processing and the power, respectively.

SUMMARY OF THE INVENTION

The present invention has been implemented in order to solve the foregoing problems; the objective thereof is to obtain a radar apparatus that, even in the case where super-resolution angle measuring processing is performed by utilizing, as an input vector, the frequency of a beat signal between a reception signal from a target object and a reception signal from another target object, the incorrect azimuth angle of another target object is discriminated and eliminated so that the correct azimuth angle is outputted.

A radar apparatus according to the present invention transmits through a transmission antenna a radio wave whose frequency is modified in a temporally increasing and decreasing manner, receives a reflected radio wave from a target object through a plurality of reception antennas, and measures by use of a calculation device a relative speed and an azimuth angle of the target object and a distance between the target object and the radar, based on a beat signal generated by mixing a transmission wave with a reception wave for each of the plurality of reception antennas. In the case where there are obtained two azimuth angles for a given target object that has been detected, the calculation device performs an other-signal detection processing in which, among other detected target objects, there is searched a target object whose azimuth angle is the same as any one of the two azimuth angles and whose beat frequency upon frequency-increasing modification or frequency-decreasing modification is the same as that of the given target object; in the case where, through the other-signal detection processing, another target object that satisfies the condition is detected, the calculation device eliminates the azimuth angle, out of two azimuth angles of the detected given target object, which is equal to the azimuth angle of said another target object detected through the other-signal detection processing.

According to the present invention, it is made possible to obtain a radar apparatus that, even in the case where a plurality of target objects exist and super-resolution angle measuring processing is performed by utilizing, as an input vector, the frequency of a beat signal including a reception signal from another target object, an incorrect azimuth angle, which is the azimuth angle of another target object, is discriminated and eliminated so that the correct azimuth angle is obtained.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 2A and FIG. 2B are a set of flowcharts for explaining signal processing according to Embodiment 1 of the present invention;

FIGS. 7A and 7B are a set of charts for explaining the reason why a correct azimuth angle and an incorrect azimuth angle can be discriminated in Embodiment 2 of the present invention.

DETAILED DESCRIPTION OF THE PREFERRED EMBODIMENTS

Embodiment 1

Figure 1:
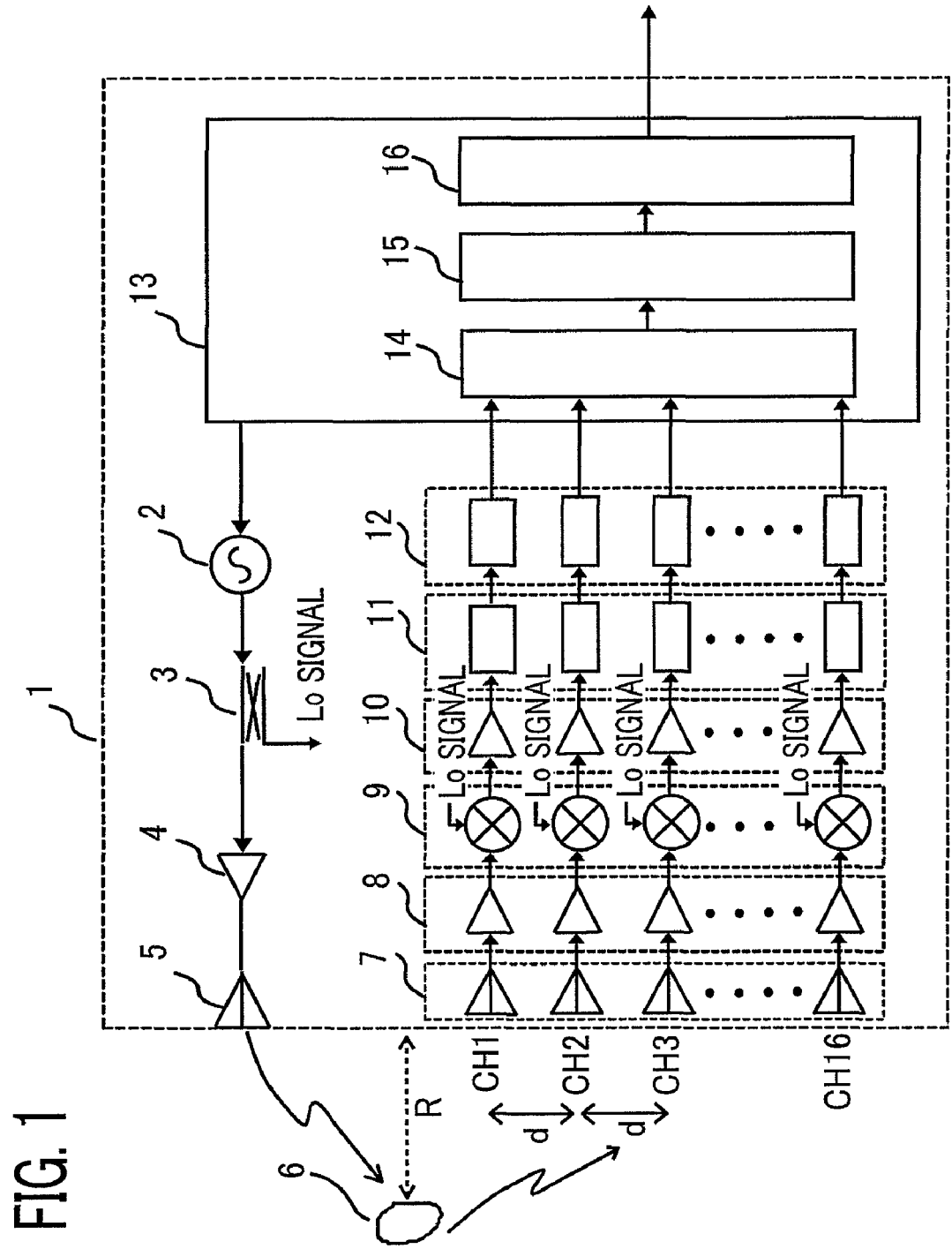
FIG. 1 is a block diagram illustrating a radar apparatus according to Embodiment 1 of the present invention.

Embodiment 1 of the present invention will be explained below, with reference to the accompanying drawings. FIG. 1 is a block diagram illustrating the configuration of Embodiment 1 of the present invention. A radar apparatus 1 according to the present invention is provided with a voltage-controlled oscillator 2 that generates an electromagnetic wave having a given frequency, a distributor 3 that distributes the power of an electromagnetic wave generated by the voltage-controlled oscillator 2 into a transmission amplifier 4 and a reception mixer 9, the transmission amplifier 4 that amplifies the power of the electromagnetic wave supplied by the distributor 3, and a transmission antenna 5 that emits the electromagnetic wave amplified by the transmission amplifier 4 as a radio wave. The radio wave emitted from the transmission antenna 5 is reflected by a target object 6 spaced a distance R apart from the transmission antenna 5; there is provided a plurality of reception antennas 7 that receives the reflected radio wave. In Embodiment 1 of the present invention, the plurality of reception antennas 7 has 16 reception element antennas for a channel CH1 through a channel CH16, and the reception element antennas are arranged in such a way as to be in a straight line and to be spaced a constant distance d apart from one another; however, it is not necessarily required that the reception element antennas are arranged in such a way as to be in a straight line and to be spaced a constant distance apart from one another.

The radar apparatus 1 also includes a reception amplifier 8 that amplifies the electric wave received through the reception antenna 7; a mixer 9 that mixes a local signal Lo from the distributor 3 with the reflected radio wave from the object 6 and outputs a beat signal corresponding to the relative speed and the azimuth angle of the object 6 and the distance from the radar apparatus 1 to the object 6; an amplifier 10; a lowpass filter 11; and an A/D converter 12 that converts a beat signal into a digital signal.

The radar apparatus 1 further includes a calculation device 13 that calculates the relative speed and the azimuth angle of the object 6 and the distance from the radar apparatus 1 to the object 6, based on an output digital value of the A/D converter 12, and controls the voltage-controlled oscillator 2. Inside the calculation device 13, there are provided a distance/relative speed calculation unit 14 that calculates the relative speed of the object 6 and the distance between the radar apparatus 1 and the object 6, an azimuth angle calculation unit 15 that calculates the azimuth angle of a detection target (object) obtained by the distance/relative speed calculation unit 14, and an azimuth angle elimination unit 16 in which, among azimuth angles obtained by the azimuth angle calculation unit 15, an erroneous azimuth angle is discriminated and eliminated.

Figure 2A:
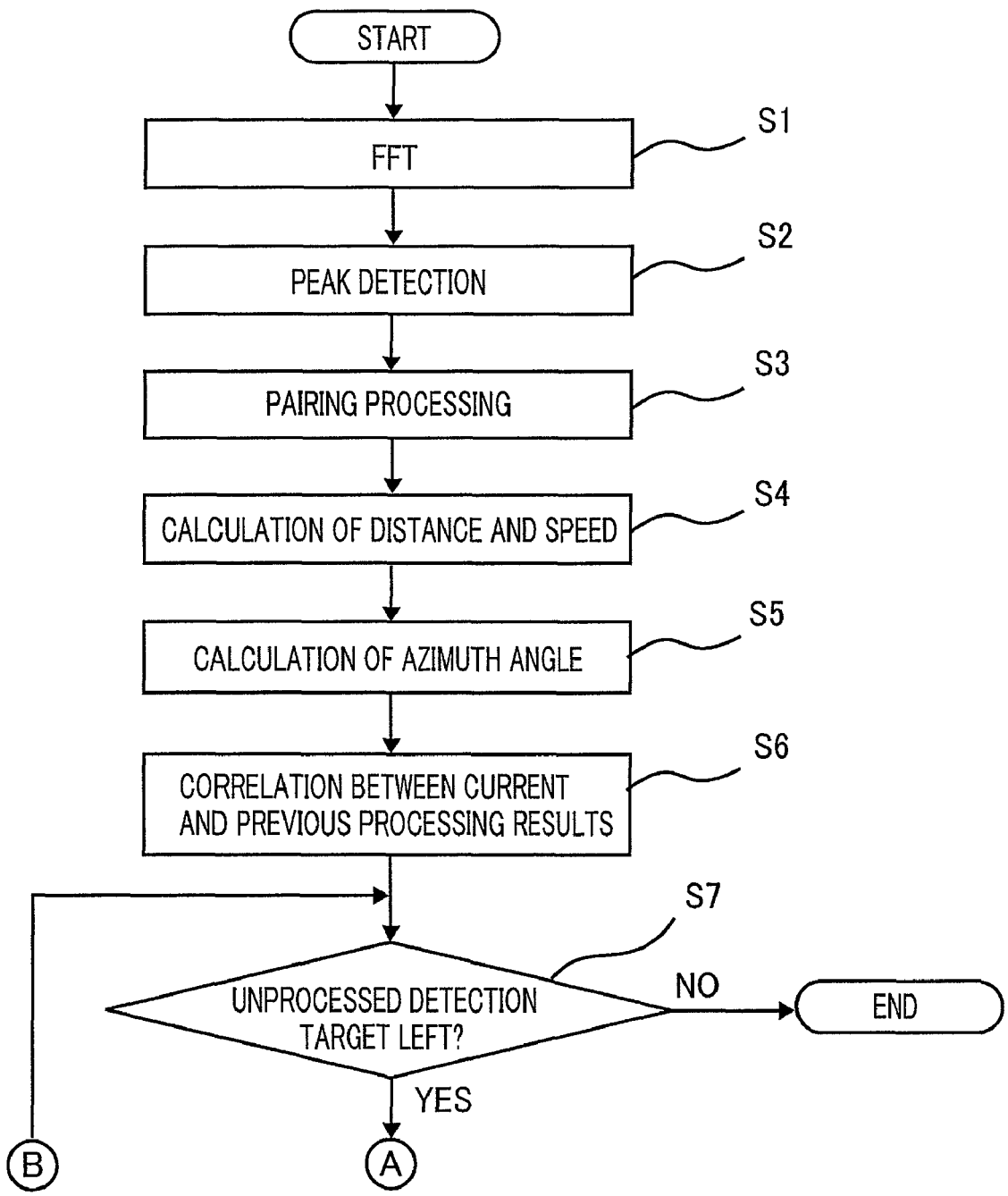
Figure 3:
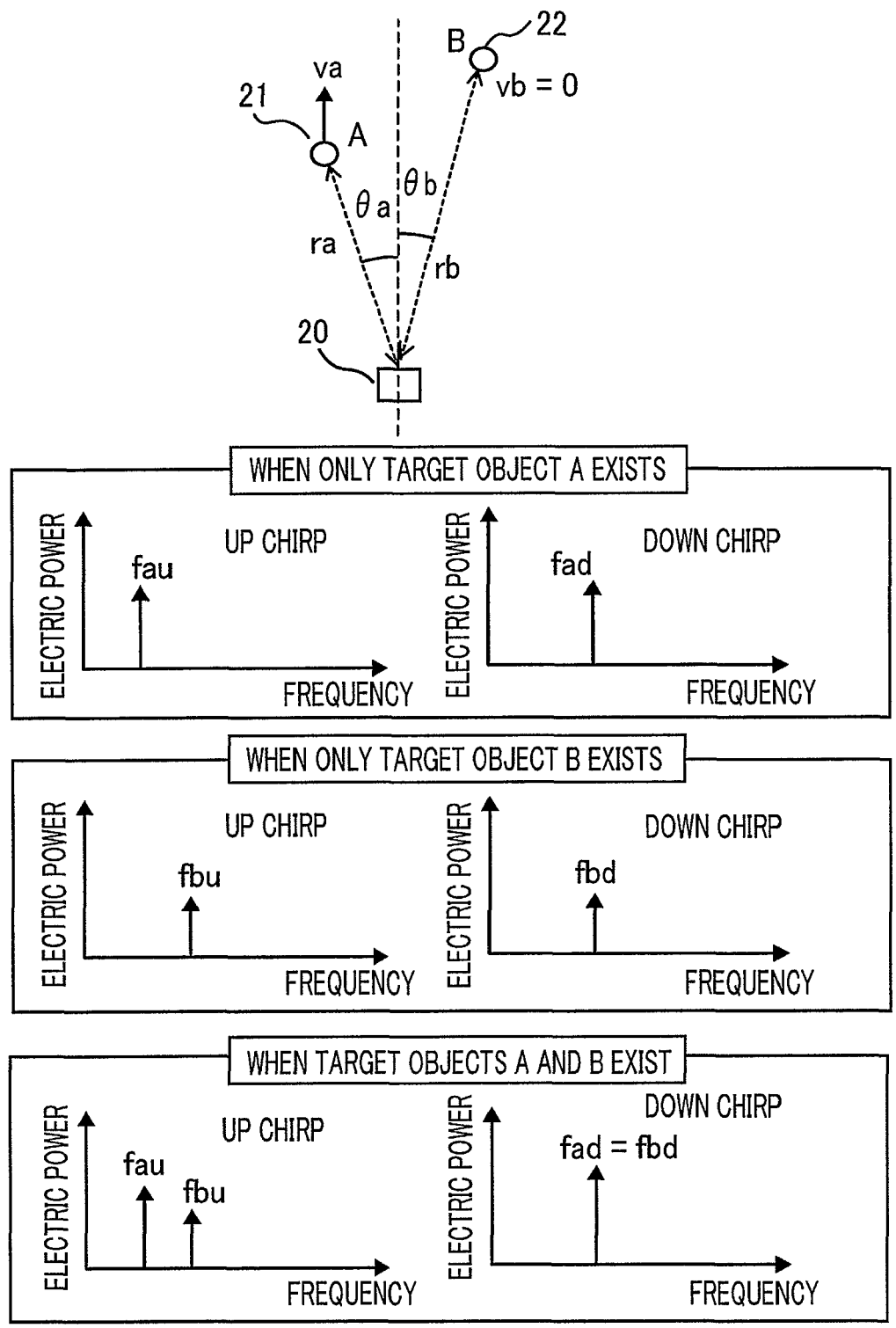
FIG. 3 is a set of charts for explaining the positional relationship between two target objects and beat frequencies in the case where, in Embodiment 1 of the present invention, the respective beat frequencies of the two target objects are equal.
Figure 4:
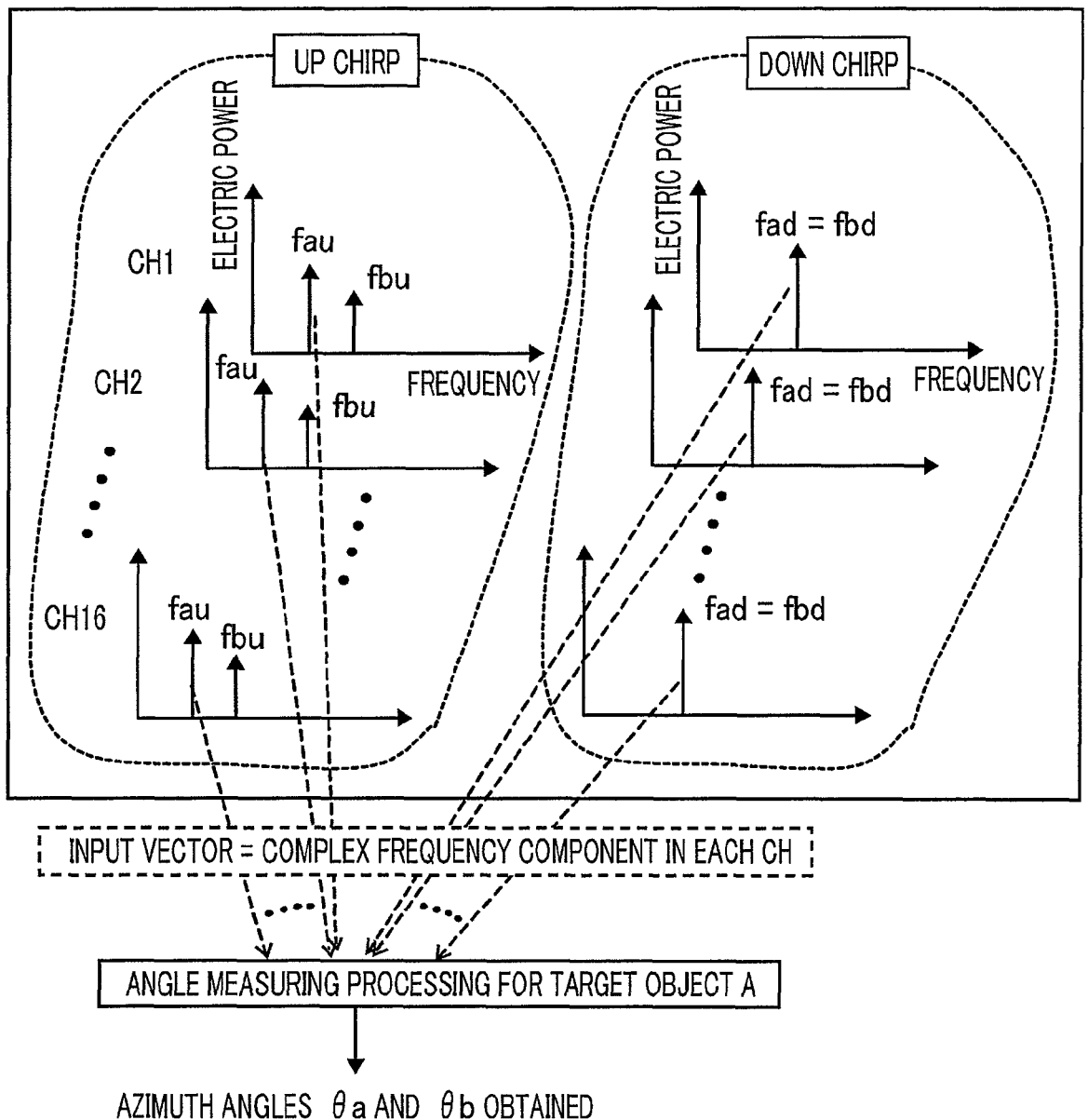
FIG. 4 is a chart for explaining the reason why a correct azimuth angle and an incorrect azimuth angle are calculated in Embodiment 1 of the present invention.

Next, the contents of signal processing performed by the calculation device 13 in the radar apparatus configured in such a manner as described above will be explained with reference to flowcharts in FIGS. 2A and 2B. The A/D converter 12 in the radar apparatus 1 supplies a digital signal to the distance/relative speed calculation unit 14. Based on the supplied digital signal, the distance/relative speed calculation unit 14 performs UP chirping, DOWN chirping, and frequency transformation, i.e., FFT processing of respective beat signals for channels CH1 through CH16 (the step S1). Next, the distance/relative speed calculation unit 14 performs peak detection processing in which a beat frequency is extracted based on the results of the UP chirping, the DOWN chirping, and frequency transformation for the respective channels (the step S2). Next, the distance/relative speed calculation unit 14 performs pairing processing in which the UP-chirp beat frequency and the DOWN-chirp beat frequency for each channel are paired with each other (the step S3). Furthermore, the distance/relative speed calculation unit 14 calculates the relative speed of a target object and the distance between the target object and the radar apparatus, based on the sum of and the difference between the beat frequencies in each of the pairs obtained as the result of the pairing processing (the step S4). The distance/relative speed calculation unit 14 receives the digital signal from the A/D converter 12 and performs these processing items in the steps S1 to S4. The method of calculating the distance and the relative speed of a target object is proposed in Japanese Patent Application Laid-Open No. 2008-39718 and other various documents; therefore, the detailed explanation therefor will be omitted.

Next, based on the result of the pairing processing performed by the distance/relative speed calculation unit 14, the azimuth angle calculation unit 15 applies wavenumber estimation to each pair through the MUSIC processing method, which is one of super-resolution angle measuring processing methods, so as to estimate the directions along which radio waves reflected by the object 6 arrive at the radar apparatus, and calculates the respective azimuth angles of the estimated directions (the step S5). The azimuth angle calculation unit 15 stores the obtained distance, the obtained relative speed, the obtained azimuth angle (one or more), and initial pairing frequencies (UP chirping and DOWN chirping) and utilizes these items as detection targets.

Next, the contents of processing in the steps S6 through S16 performed by the azimuth angle elimination unit 16 will be explained. By evaluating, for each azimuth angle, the correlation between each of the obtained detection targets and its past detection target, it is determined whether or not the detection target has continuously been detected; in the case where the detection target has continuously been detected, the number of detection instances is stored as a detection number (the step S6). In the following steps S7 through S16, it is determined for each detection target whether or not an erroneous azimuth angle has been calculated; in the case where it is determined that an erroneous azimuth angle has been calculated, processing for eliminating information on the azimuth angle is performed. In the first place, it is determined whether or not any detection target to be discriminated is left unprocessed (the step S7); in the case where no detection target to be discriminated is left unprocessed, the processing is ended. In the case where detection targets to be discriminated are left unprocessed, one of the remaining detection targets is selected (the step S8). Next, it is determined whether or not there exist two azimuth angles for the selected detection target (the step S9); in the case where there exists only one azimuth angle, the step S7 is resumed and it is determined whether or not any detection target is left unprocessed. In the case where there exist two azimuth angles, it is determined whether or any not one of the two azimuth angles coincides with any one of the azimuth angles of other detection targets (the step S10). In the case where, in the step 10, there exists no other detection targets whose azimuth angles do not coincide with any one of the azimuth angles of the selected detection target (the step S11), the step S7 is resumed and it is determined whether or not any detection target is left unprocessed.

In the case where any one of the two azimuth angles coincides with any one of the azimuth angles of other detection targets (the step S11), the step S11 is followed by the step S12 where it is determined whether or not any one of the initial pairing beat frequencies (UP chirping and DOWN chirping) of the selected detection target coincides with any one of the initial pairing beat frequencies of the detection target whose azimuth angle is equal to that of the selected detection target (the step S12). In the case where none of the initial pairing beat frequencies (UP chirping and DOWN chirping) of the selected detection target coincides with any one of the initial pairing beat frequencies of the detection target whose azimuth angle is equal to that of the selected detection target, the step S7 is resumed and it is determined whether or not any detection target is left unprocessed. In the case where any one of the initial pairing beat frequencies (UP chirping and DOWN chirping) of the selected detection target coincides with any one of the initial pairing beat frequencies of the detection target whose azimuth angle is equal to that of the selected detection target, it is determined whether the number of azimuth angles of another detection target whose azimuth angle coincides with any one of the azimuth angles of the selected detection target is only one or two (the step S13) In the case where the number of azimuth angles of another detection target is only one, the step S13 is followed by the step S14 where it is determined that, when the super-resolution angle measuring processing has been applied to detection targets to be discriminated, the radio wave reflected by a detection target whose azimuth angle is equal to the selected detection target has caused an erroneous azimuth angle to be calculated, and the azimuth angles, among the azimuth angles of the detection targets to be discriminated, which are equal to any one of the azimuth angles of the selected detection target are eliminated (the step S14).

In the case where, in the step 13, it is determined that the number of azimuth angles of another detection target whose azimuth angle coincides with any one of the azimuth angles of the selected detection target is two, the step S13 is followed by the step S15 where it is determined whether or not all of the two azimuth angles of the detection target to be discriminated are equal to the two respective azimuth angles of another detection target whose azimuth angles are equal to any one of the azimuth angles of the detection target to be discriminated (the step S15). In the case where the number of azimuth angles is only one, the step S15 is followed by the step S14 where processing the same as the foregoing processing is performed. In the case where all of the two azimuth angles of the detection target to be discriminated are equal to the two respective azimuth angles of another detection target, it is conceivable that erroneous azimuth angles are calculated because the detection target to be discriminated and another detection target whose azimuth angles are equal to any one of the azimuth angles of the detection target to be discriminated affect each other; thus, based on the information that has ever been obtained, priority is given to the distance, the relative speed, and the azimuth angle that have continuously been detected, and the newly detected azimuth angle is eliminated (the step S16).

Figure 5:
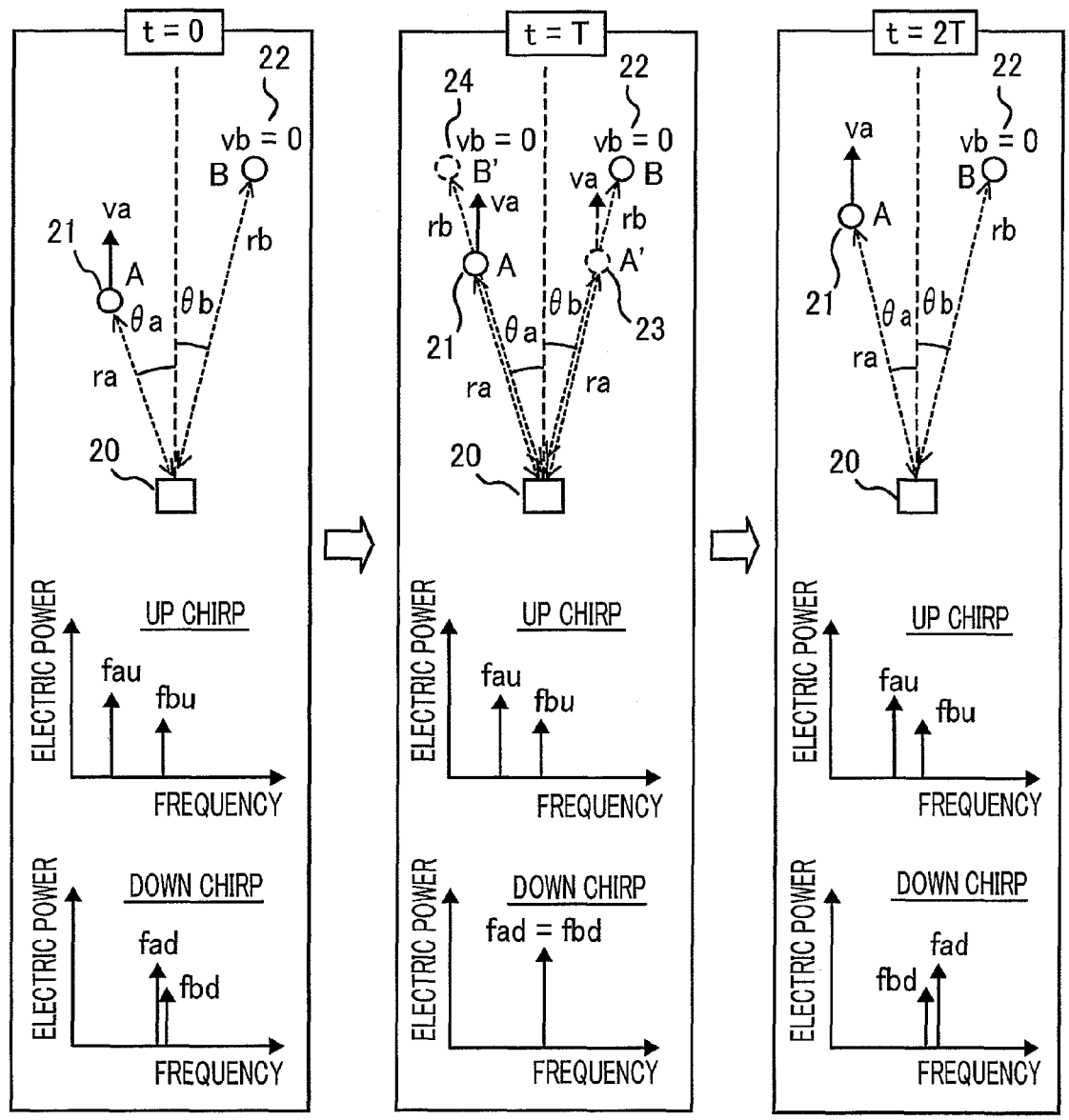
FIG. 5 is a set of charts representing the changes with time of the positions of target objects and beat frequencies in Embodiment 1 of the present invention.

The reason why the priority is decided based on the past information in the step S16 will be explained with reference to FIG. 5. In FIG. 5, reference numeral 20 denotes a radar apparatus; reference numeral 21 denotes a detection target A having a distance of ra from the radar apparatus 20, a relative speed of va, and an azimuth angle of θa; reference numeral 22 denotes a detection target B having a distance of rb from the radar apparatus 20, a relative speed of vb (=0), and an azimuth angle of θb; reference numeral 23 denotes a detection target A' that appears at a position of a distance of ra because an erroneous azimuth angle is obtained when the azimuth angle of the detection target A is measured; reference numeral 24 denotes a detection target B' that appears at a position of a distance of rb because an erroneous azimuth angle is obtained when the azimuth angle of the detection target B is measured.

In the case where, upon UP chirping or DOWN chirping, the beat frequencies of two detection targets A and B are equal, the relative speeds of the two detection targets definitely differ from each other. In the case where the beat frequencies and the relative speeds of two detection targets A and B are equal, the distances are also equal; thus, the detection targets A and B are out of the discussion subject. The relative speeds of the two detection targets do not concurrently become zero; therefore, the distance of at least one detection target changes with time. In other words, at least one beat frequency changes with time, and only at an instant (at t=T, in FIG. 5), the beat frequencies upon any one of UP chirping and DOWN chirping become equal. At time instants (t=0 and t=2T, in FIG. 5) before and after the foregoing time instant (t=T), the beat frequencies do not become equal; therefore, no erroneous azimuth angle is calculated. Only when the beat frequencies become equal, an erroneous azimuth angle appears. Meanwhile, because a correct azimuth angle appears continuously from the past to the present, it can be determined which azimuth angle is erroneous, by referring to detection target that continuously appears from the past. In the case where, at a given time instant, the detection targets A and A' actually exist at positions of the same distance, e.g., ra, the detection targets A and A' should exist at time instants before and after the foregoing time instant; therefore, it is not determined that the existence of the detection target A' is caused by an erroneous azimuth angle.

Embodiment 2

Figure 6:
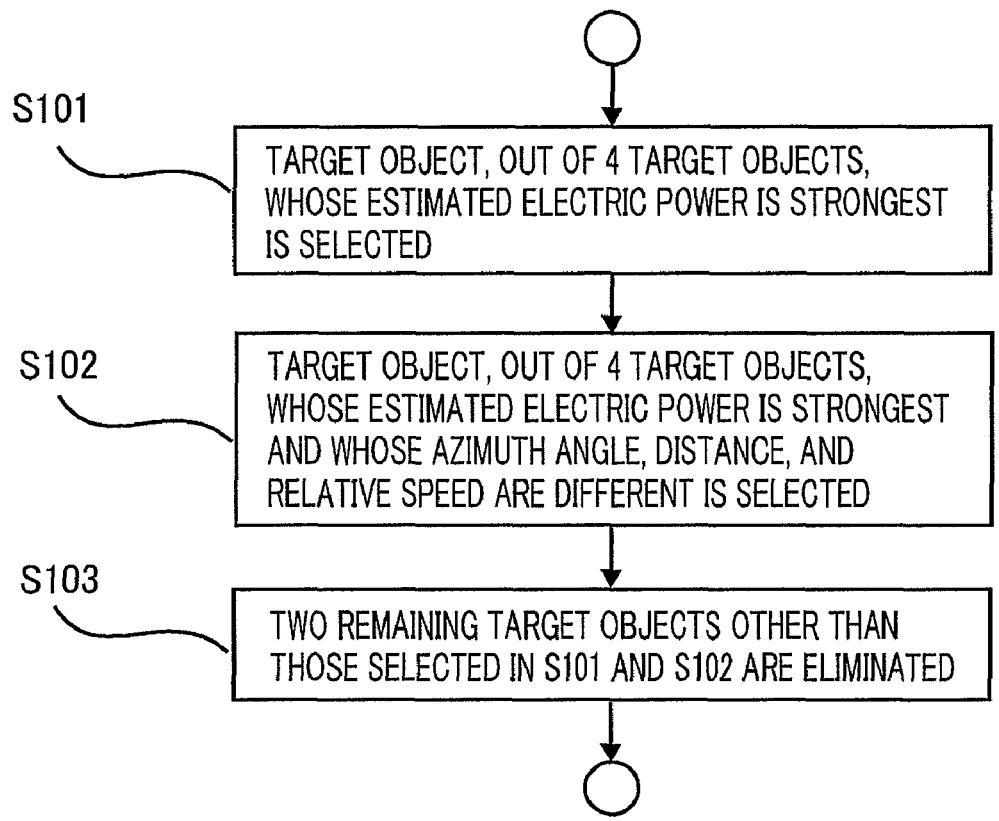
FIG. 6 is a flowchart for explaining signal processing according to Embodiment 2 of the present invention.

The contents of signal processing according to Embodiment 2 of the present invention will be explained with reference to a flowchart in FIG. 6. In addition, the configuration of a radar apparatus is the same as that in FIG. 1, and the contents of signal processing is the same as those in FIGS. 2A and 2B, except for the portion corresponding to the step S16; therefore, explanations for the portions that overlap those in FIGS. 2A and 2B will be omitted.

In the case where two detection targets A and B exist, the azimuth angle elimination unit 16 firstly selects the largest estimated electric power among the estimated electric powers Pa1, Pa2, Pb1, and Pb2 of the reflected waves corresponding to four azimuth angles consisting of two respective azimuth angles of the two detection targets (the step S101). It is assumed that the estimated electric power is obtained when an azimuth angle is calculated by means of MUSIC. Next, there are selected the reflected waves whose azimuth angles and distances are different from those of the foregoing reflected wave, having the largest estimated electric power, which is selected in the step 101 (the step S102). Next, remaining two reflected waves that are different from those selected in the steps S101 and 102 are eliminated (the step S103).

Figure 7A:
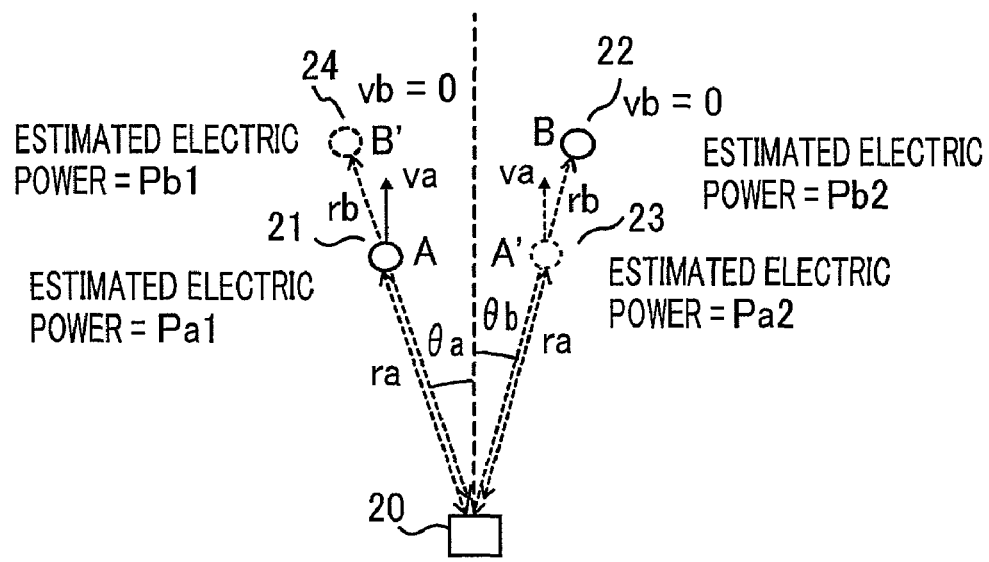

The ground for the method represented by the flowchart in FIG. 6 will be explained with reference to FIGS. 7A and 7B. The estimated electric power corresponding to an erroneous azimuth angle is inputted only through a signal upon UP chirping or DOWN chirping; however, the estimated electric power corresponding to a correct azimuth angle is inputted through a signal upon UP chirping and a signal upon DOWN chirping. Accordingly, the estimated electric power in the case of a correct azimuth angle is larger than that in the case of an erroneous azimuth angle; thus, discrimination of a correct azimuth angle can be performed. Even in the case where the reception powers of the detection targets A and B are different from each other, the largest estimated electric power among four estimated electric powers definitely corresponds to a correct azimuth angle. In the case of FIGS. 7A and 7B, the following equations are given.

$$Pa1 > Pa2 \quad (1)$$

$$Pb2 > Pb1 \quad (2)$$

In the case where the reflected wave from the detection target A is far stronger than that from the detection target B, the reflected wave from the detection target A may cause an error in the estimated electric power of the detection target B, whereby the equation (2) is not correctly satisfied. Even in this case, the equation (1) does not undergo the effect of the detection target B whose reflected wave is far weaker than that of the detection target A. Accordingly, the largest estimated electric power Pa1 among the four estimated electric powers Pa1, Pa2, Pb1, and Pb2 is selected in the step S101, and then Pb2 that is different from Pa1 in azimuth angle and distance is selected, so that a correct azimuth angle can securely be obtained.

In Embodiments 1 and 2 of the present invention, there are described a case where the beat frequencies of two detection targets coincide with each other; however, even in the case where the beat frequencies of tree or more detection targets coincide with one another, the same processing can be performed.

Various modifications and alterations of this invention will be apparent to those skilled in the art without departing from the scope and spirit of this invention, and it should be understood that this is not limited to the illustrative embodiments set forth herein.

What is claimed is:

1. A radar apparatus transmitting through a transmission antenna a radio wave whose frequency is modified in a temporally increasing and decreasing manner, and receiving a reflected radio wave from a target object through a plurality of reception antennas, the radar apparatus comprising:

a calculation device which calculates a relative speed and an azimuth angle of the target object and a distance between the target object and the radar, based on a beat signal generated by mixing a transmission wave with a reception wave for each of a plurality of reception antennas, wherein, if two azimuth angles are obtained for a given target object that has been detected, the calculation device performs an other-signal detection processing in which, among other detected target objects, there is searched a target object whose azimuth angle is the same as any one of the two azimuth angles and whose beat frequency upon frequency-increasing modification or frequency-decreasing modification is the same as that of the given target object; and in the case where, through the other-signal detection processing, another target object that satisfies the condition is detected, the calculation device eliminates the azimuth angle, out of two azimuth angles of the detected given target object, which is equal to the azimuth angle of said another target object detected through the other-signal detection processing.

2. The radar apparatus according to claim 1, wherein the calculation device evaluates the correlation between a result of target-object detection stored upon a past measurement and a result of current target-object detection so as to calculate the number of detection instances, and in the case where two azimuth angles are obtained also for said another target object and the two respective azimuth angles of the given target object are equal to the two azimuth angles of said another target object, the calculation device determines priority, based on the number of detection instances and eliminates the azimuth angles in order of priority.

3. The radar apparatus according to claim 1, wherein, in the case where two azimuth angles are obtained also for said another target object and the two respective azimuth angles of the given target object are equal to the two azimuth angles of said another target object, the calculation device determines priority, based on respective reception electric powers from the azimuth angles or respective values corresponding to the reception electric powers and eliminates the azimuth angles in order of priority.

* * * * *